(12) United States Patent
Wang

(10) Patent No.: US 9,639,220 B2
(45) Date of Patent: May 2, 2017

(54) TOUCH SCREEN AND DISPLAY DEVICE

(71) Applicant: BOE TECHNOLOGY GROUP CO., LTD., Beijing (CN)

(72) Inventor: Xinxing Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 32 days.

(21) Appl. No.: 14/435,566

(22) PCT Filed: Aug. 15, 2014

(86) PCT No.: PCT/CN2014/084523
§ 371 (c)(1),
(2) Date: Apr. 14, 2015

(87) PCT Pub. No.: WO2015/154361
PCT Pub. Date: Oct. 15, 2015

(65) Prior Publication Data
US 2016/0139701 A1    May 19, 2016

(30) Foreign Application Priority Data
Apr. 9, 2014 (CN) .......................... 2014 1 0140409

(51) Int. Cl.
*G06F 3/044* (2006.01)
*G06F 3/046* (2006.01)
*G06F 3/041* (2006.01)

(52) U.S. Cl.
CPC .............. *G06F 3/044* (2013.01); *G06F 3/046* (2013.01); *G06F 3/0416* (2013.01); *G06F 2203/04106* (2013.01)

(58) Field of Classification Search
None
See application file for complete search history.

(56) References Cited

U.S. PATENT DOCUMENTS

| 8,274,486 B2 | 9/2012 | Barbier et al. |
| 2011/0298725 A1 | 12/2011 | Yeh et al. |
| 2014/0078104 A1 | 3/2014 | Lee et al. |

FOREIGN PATENT DOCUMENTS

| CN | 101763191 A | 6/2010 |
| CN | 102375612 A | 3/2012 |
| CN | 102541384 A | 7/2012 |
| CN | 102955639 A | 3/2013 |

(Continued)

OTHER PUBLICATIONS

Chinese Office Action in Chinese Application No. 201410140409.3 mailed Apr. 21, 2016 with English translation.

(Continued)

*Primary Examiner* — Kenneth B Lee, Jr.
(74) *Attorney, Agent, or Firm* — Collard & Roe, P.C.

(57) ABSTRACT

Disclosed are a touch screen and a display device. In the touch screen, the first electromagnetic touch electrodes (210) and the capacitive touch sensing electrodes (110) are disposed in the same layer, the second electromagnetic touch electrodes (220) and the capacitive touch driving electrodes (120) are disposed in the same layer, such that it is possible to simplify layer structures of the touch screen to a great extent, thereby reducing the thickness of the entire touch screen, while guaranteeing electromagnetic touch effect and capacitive touch effect, and simplify the manufacturing process and in turn save the production costs of the entire touch screen.

19 Claims, 7 Drawing Sheets

(56) References Cited

FOREIGN PATENT DOCUMENTS

| CN | 103941946 A | 7/2014 |
|----|---|---|
| CN | 203759677 U | 8/2014 |
| KR | 10-2014-0035788 A | 3/2014 |
| TW | 201128509 A | 8/2011 |

OTHER PUBLICATIONS

International Search Report of PCT/CN2014/084523 in Chinese with English translation, mailed Dec. 31, 2014.
Notice of Transmittal of the International Search Report of PCT/CN2014/084523 in Chinese, mailed Dec. 31, 2014.
Written Opinion of the International Searching Authority of PCT/CN2014/084523 in Chinese with English translation, mailed Dec. 31, 2014.
Second Chinese Office Action in Chinese Application No. 201410140409.3 mailed Aug. 12, 2016 with English translation.

TOUCH SCREEN AND DISPLAY DEVICE

CROSS REFERENCE TO RELATED APPLICATIONS

This application is the National Stage of PCT/CN2014/084523 filed on Aug. 15, 2014, which claims priority under 35 U.S.C. §119 of Chinese Application No. 201410140409.3 filed on Apr. 9, 2014, the disclosure of which is incorporated by reference.

TECHNICAL FIELD

Embodiments of the present invention relate to a touch screen and a display device.

BACKGROUND

With the rapid development of display technology, touch screen panels have become popular in life gradually. At present, touch screens can be classified into the following types according to their operation principles: resistive type, capacitive type, infrared type, surface acoustic wave type, electromagnetic type, vibrating wave induction type, etc.

Capacitive touch screens have received much attention in the industry due to their unique touch principle and advantages such as high sensitivity, long life, and high light transmittance. Presently, capacitive touch screens are generally of a front-attachment type, in which capacitive touch driving electrodes and capacitive touch sensing electrodes both made of a transparent conducting material and insulated from each other are disposed. When a finger touches the touch screen, since the human body is a conductor, coupling capacitance is generated between the finger and both the capacitive touch driving electrodes and the capacitive touch sensing electrodes in the touch screen, resulting in capacitance variation around the touch point, which causes an induced current flowing through the touch point in the capacitive touch driving electrodes and the capacitive touch sensing electrodes. The position of touch point can be calculated accurately by relevant calculations.

Electromagnetic touch screens are widely used in many advanced computer aided design (CAD) systems such as AutoCAD due to its feature of realizing hand writing like original chirography. At present, electromagnetic touch screens generally adopt an electromagnetic antenna panel of a back-attachment type that comprises metal wires crossing each other horizontally and vertically. FIG. 1 is a structure diagram of an electromagnetic touch antenna panel in which metal wires in X direction and metal wires in Y direction are perpendicular to each other and insulated from each other by an insulating layer interposed therebetween. FIG. 2 shows the electromagnetism touch schematic diagram. Two metal wires, namely touch electrodes Y1 and Y2, are connected by a touch electrode in X direction to be equivalent to a resistance Rx. When an electromagnetic pen approaches the assembly surface and slides thereon, the electromagnetic wave passes through the wires, generating an induced electromotive force V, and the closer to the position of the electromagnetic pen, the stronger the induced electromotive force is. The magnitude of potential vector received by the touch electrodes Y1 and Y2 is equivalently expressed by the position of a sliding arrowhead over the resistor to thereby determine the magnitude of induced electromotive force on the electrode in Y direction, and ultimately determine the position in Y direction. In a similar way, the electrodes in X direction work in a same principle. Because these two groups of electrodes overlap each other, the movement of pen can be considered as synchronized sliding in a same direction or an opposite direction on two sliding resistors. Once the X and Y coordinates are determined, it is possible to calculate the coordinate position of the pen point on a plane. Meanwhile, the front end of the electromagnetic pen is provided with a pressure sensing device that can determine the wideness of chirography through the force of pressing, which is why the electromagnetic touch antenna panel can realize hand writing like original chirography. The main control chip processes and computes the voltage signals received by the touch antenna panel to obtain the position of the electromagnetic pen and the pressure of the pen.

At present, in order to realize dual touch by finger and pen, capacitive and electromagnetic types may be combined.

SUMMARY

At least one embodiment of the present invention provides a touch screen and a display device to reduce the thickness of the entire touch screen while guaranteeing electromagnetic touch function and capacitive touch function.

At least one embodiment of the present invention provides a touch screen including: capacitive touch sensing electrodes; capactive touch driving electrodes, insulated from and disposed to intersect the capacitive touch sensing electrodes; first electromagnetic touch electrodes, insulated from and disposed in a same layer as the capacitive touch sensing electrodes; second electromagnetic touch electrodes, insulated from and disposed in a same layer as the capactive touch driving electrodes, and insulated from and disposed to intersect the first electromagnetic touch electrodes.

At least one embodiment of the present invention provides a display device including a display device and any of the above-mentioned touch screens provided in embodiments of the present invention disposed on the display device.

BRIEF DESCRIPTION OF DRAWINGS

In order to explain the technical solution of embodiments of the present invention more clearly, accompanying drawings of the embodiments will be introduced briefly below. Obviously, the accompanying drawings in the following description only relate to some embodiments of the present invention rather than limiting the present invention.

DETAIL DESCRIPTION

Figure 1:
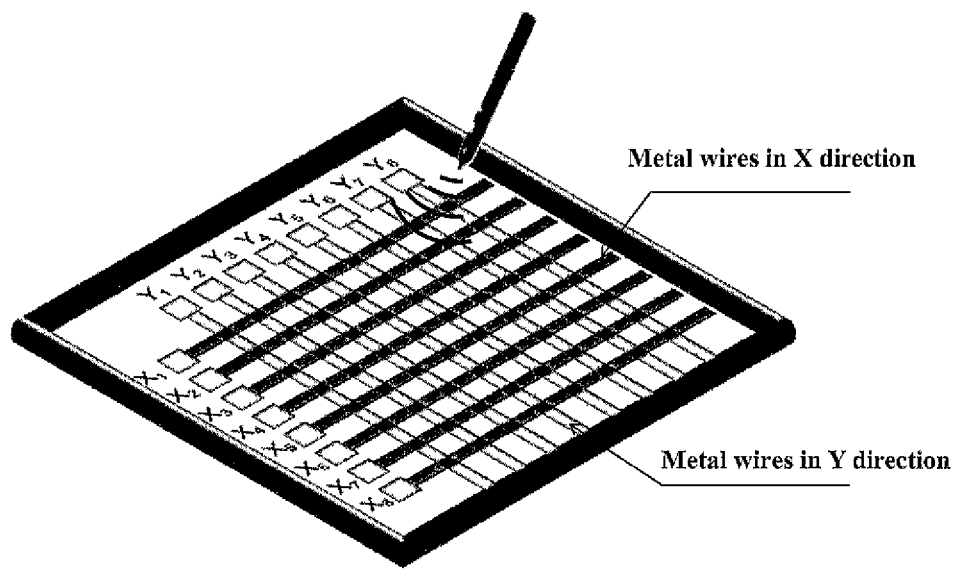
FIG. 1 is a structure diagram of an electromagnetic touch antenna panel.
Figure 2:
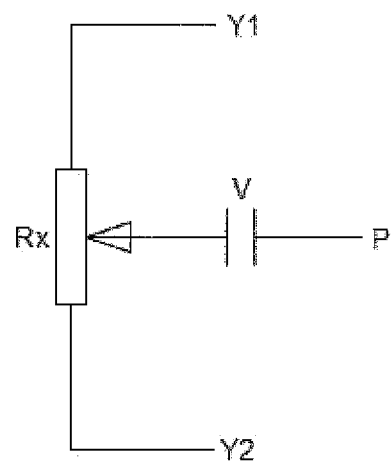
FIG. 2 is a schematic diagram of electromagnetic touch.

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Film thicknesses and area sizes of layers in the drawings do not reflect the real scale of the touch screen and are only intended to illustrate contents of the present invention.

The inventors have noted that combination of capacitive and electromagnetic touch screens would lead to a thick final product that is not desired in the market at present.

Figure 3:
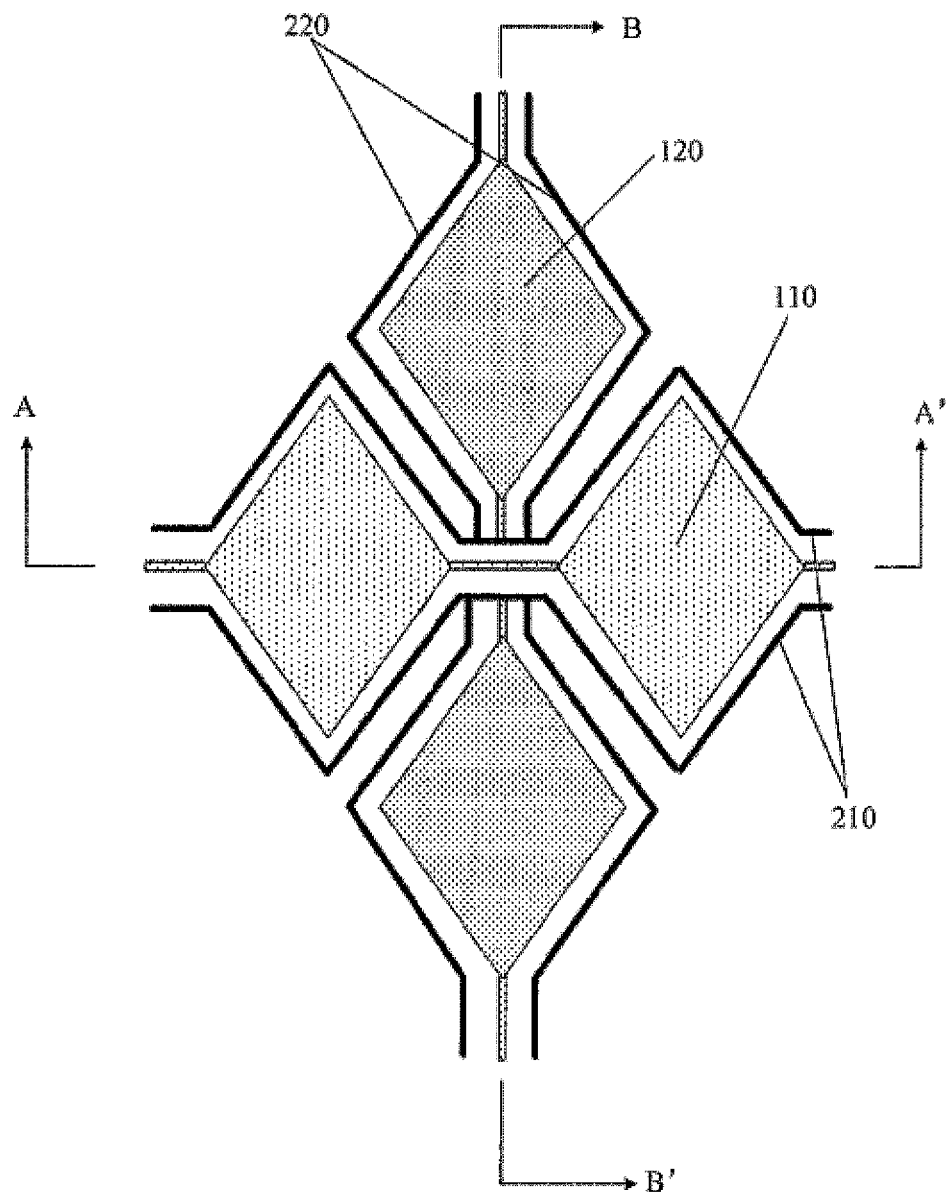
FIG. 3 is a structure diagram I of a touch screen provided in an embodiment of the present invention.

At least one embodiment of the present invention provides a touch screen as shown in FIG. 3, including: capacitive touch sensing electrodes 110; and capacitive touch driving electrodes 120 insulated from and disposed to intersect with the capacitive touch sensing electrodes 110. The touch screen further includes: first electromagnetic touch electrodes 210 insulated from and disposed in the same layer as capacitive touch sensing electrodes 110; and second electromagnetic touch electrodes 220, which are insulated from and disposed in the same layer as capacitive touch driving electrodes 120 and also insulated from and disposed to intersect first electromagnetic touch electrodes 210.

In the above-mentioned touch screen provided in at least one embodiment of the present invention, the first electromagnetic touch electrodes and the capacitive touch sensing electrodes are disposed in the same layer, and the second electromagnetic touch electrodes and the capacitive touch driving electrodes are disposed in the same layer, such that it is possible to simplify layer sturcuters of the touch screen to a great extent, thereby reducing the thickness of the entire touch screen, while guaranteeing electromagnetic touch effect and capacitive touch effect.

For example, while manufacturing, the first electromagnetic touch electrodes and the capacitive touch sensing electrodes may be manufactured by same one patterning process, the second electromagnetic touch electrodes and the capactive touch driving electrodes may be manufactured by same one patterning process, thereby simplifying the manufacturing process to a great extent and in turn saving the production costs of the entire touch screen.

In at least one embodiment of the present invention, in order to increase the light transmittance of the touch assembly as much as possible, for example, the material(s) for the capacitive touch sensing electrodes, the capacitive touch driving electrodes, the first electromagnetic touch electrodes and the second electromagnetic touch electrodes may all comprise a transparent conducting oxide such as indium tin oxide (ITO).

In at least one embodiment of the present invention, in order to further increase the light transmittance of the touch screen, for example, the capacitive touch sensing electrodes, the capactive touch driving electrodes, the first electromagnetic touch electrodes and the second electromagnetic touch electrodes are disposed in the same layer. In this situation, the touch screen further includes: a bridging layer configured for bridging adjacent capacitive touch sensing electrodes and bridging adjacent first electromagnetic touch electrodes, or a bridging layer configured for bridging adjacent capacitive touch driving electrodes and bridging adjacent second electromagnetic touch electrodes; and an insulating layer between the bridging layer and the capacitive touch sensing electrodes, the capactive touch driving electrodes, the first electromagnetic touch electrodes and the second electromagnetic touch electrodes disposed in the same layer.

In this situation, it can be understood from the structure of touch screen provided in at least one embodiment of the present invention, the touch screen may include three primary layers, namely a transparent conducting oxide layer comprising the capacitive touch driving electrodes, the capacitive touch sensing electrodes, the first electromagnetic touch electrodes and the second electromagnetic touch electrodes disposed in the same layer, a metal layer comprising the bridging layer configured for bridging adjacent capacitive touch sensing electrodes and bridging adjacent first electromagnetic touch electrodes or the bridging layer configured for bridging adjacent capacitive touch driving electrodes and bridging adjacent second electromagnetic touch electrodes, and an insulating layer between the transparent conducting oxide layer and the metal layer. In addition, there is generally a passivation layer on the topside of the touch screen for protecting the touch screen from external environment. The touch screen of the above-mentioned structure comprises fewer layers, and can reduce the thickness of the final product to a great extent while implementing both electromagnetic touch function and capacitive touch function.

Figure 4A:
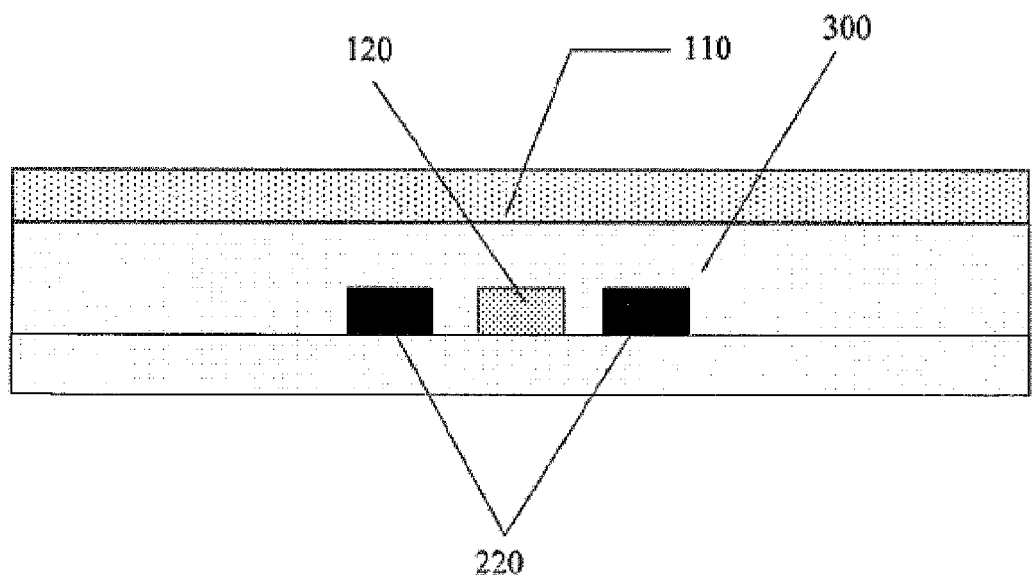
FIG. 4a is a schematic cross section along A-A' direction of FIG. 3.
Figure 4B:
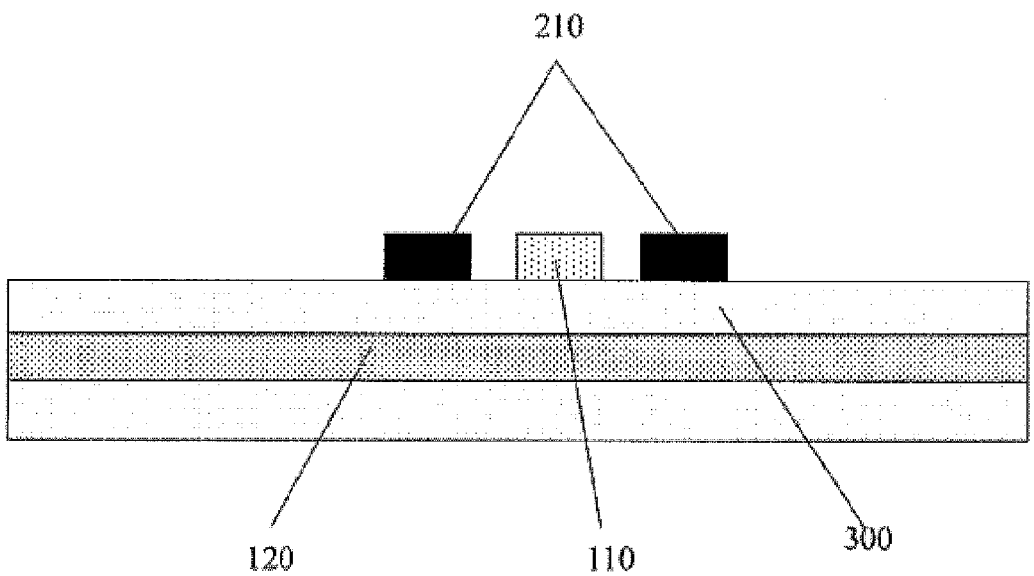
FIG. 4b is a schematic cross section along B-B' direction of FIG. 3.

FIG. 4a is a schematic cross section along A-A' direction of FIG. 3; and FIG. 4b is a schematic cross section along B-B' direction of FIG. 3. In the above-mentioned touch screen provided in at least one embodiment of the present invention, as shown in FIGS. 3, 4a and 4b, the first electromagnetic touch electrodes 210 and the second electromagnetic touch electrodes 220 may also be disposed on different planes, that is, the first electromagnetic touch electrodes 210 and the capacitive touch sensing electrodes 110 are disposed in the same layer while the second electromagnetic touch electrodes 220 and the capactive touch driving electrodes 120 are disposed in the same layer but not a different layer from the former. In this case, the touch screen further includes an insulating layer 300 between the capacitive touch sensing electrodes 110 and the first electromagnetic touch electrodes 210 disposed in the same layer and the capacitive touch driving electrodes 120 and the second electromagnetic touch electrodes 220 disposed in the same layer.

In this way, as can be understood from the structure of the touch screen provided in at least one embodiment of the present invention, the touch screen may also include three primary layers, namely a first transparent conducting oxide layer comprising the capacitive touch sensing electrodes and the first electromagnetic touch electrodes disposed in the same layer, a second transparent conducting oxide layer comprising the capacitive touch driving electrodes and the second electromagnetic touch electrodes disposed in the same layer, and an insulating layer between the first transparent conducting oxide layer and the second transparent conducting oxide layer. In addition, there is generally provided a passivation layer on the topside of the touch screen for protecting the touch screen from external environment.

The touch screen of the above-mentioned structure has fewer layers, and can reduce the thickness of the final product to a great extent while implementing both electromagnetic touch function and capacitive touch function.

Figure 6:
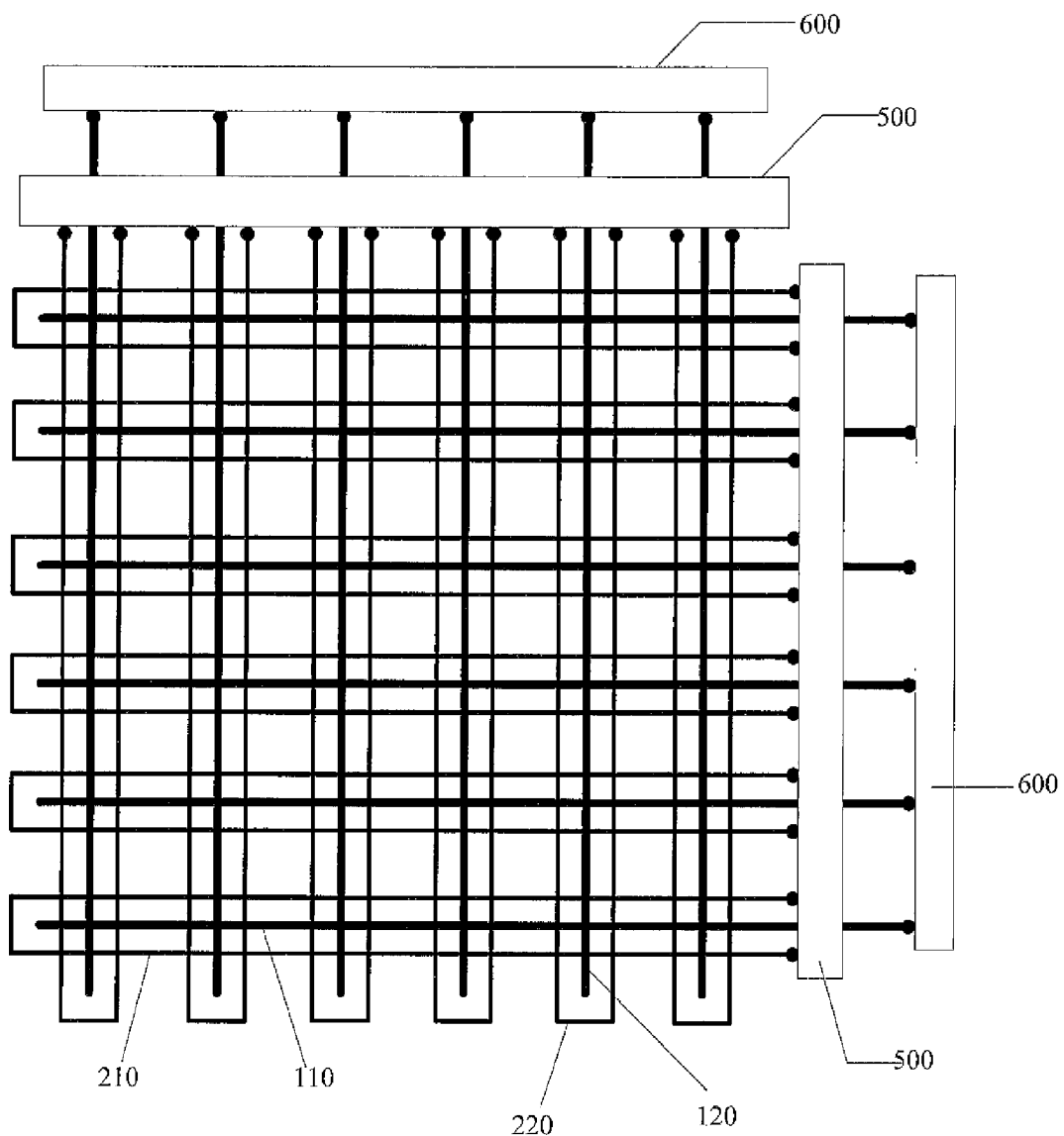
FIG. 6 is a structure diagram II of a touch screen provided in an embodiment of the present invention.

In the above-mentioned touch screen provided in at least one embodiment of the present invention, as shown in FIG. 6, the extension direction of the first electromagnetic touch electrodes 210 may intersect, for example be perpendicular to, the extension direction of the second electromagnetic touch electrodes 220, which is not limited here in the present invention.

Figure 5A:
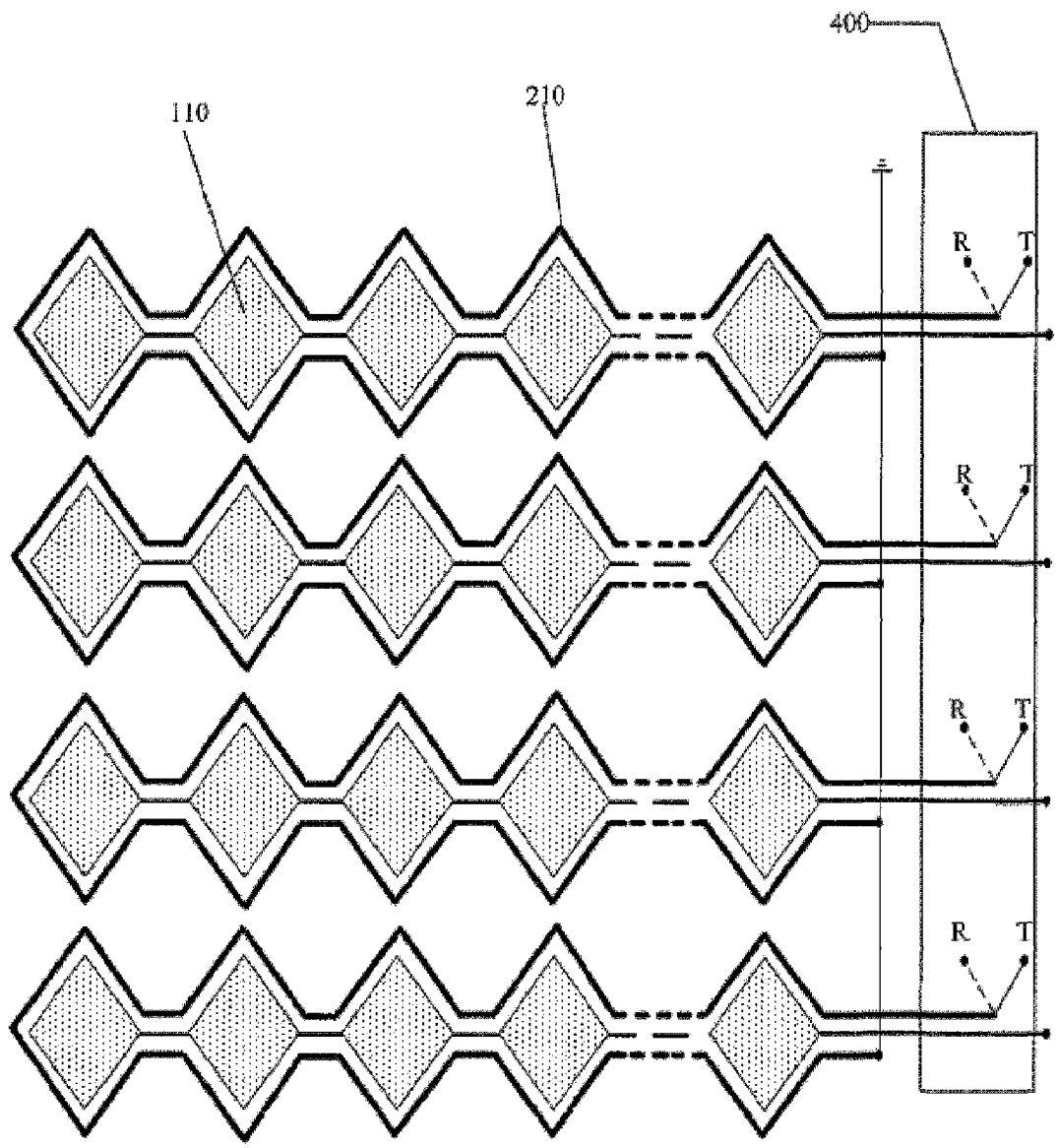
FIG. 5a is a structure diagram of capacitive touch sensing electrodes and first electromagnetic touch electrodes that are disposed in a same layer provided in an embodiment of the present invention.

In the above-mentioned touch screen provided in at least one embodiment of the present invention, as shown in FIG. 5a, the first electromagnetic touch electrodes 210 are electrode wires each surrounding at least one capacitive touch sensing electrode 110. In this case, one end of the electrode wire is grouned, while the other end is connected to a data selector 400 (MUX), thereby forming a current loop. When an electromagnetic pen touches the touch screen at a certain position, magnetic flux in the current loop at the corresponding position increases, resulting in an increased induced electromotive force on the electrode wire. Assuming that the extension direction of the first electromagnetic touch electrodes is the X axis direction, it is possible to calculate the X axis coordinate of the contact position of the electromagnetic pen.

Figure 5B:
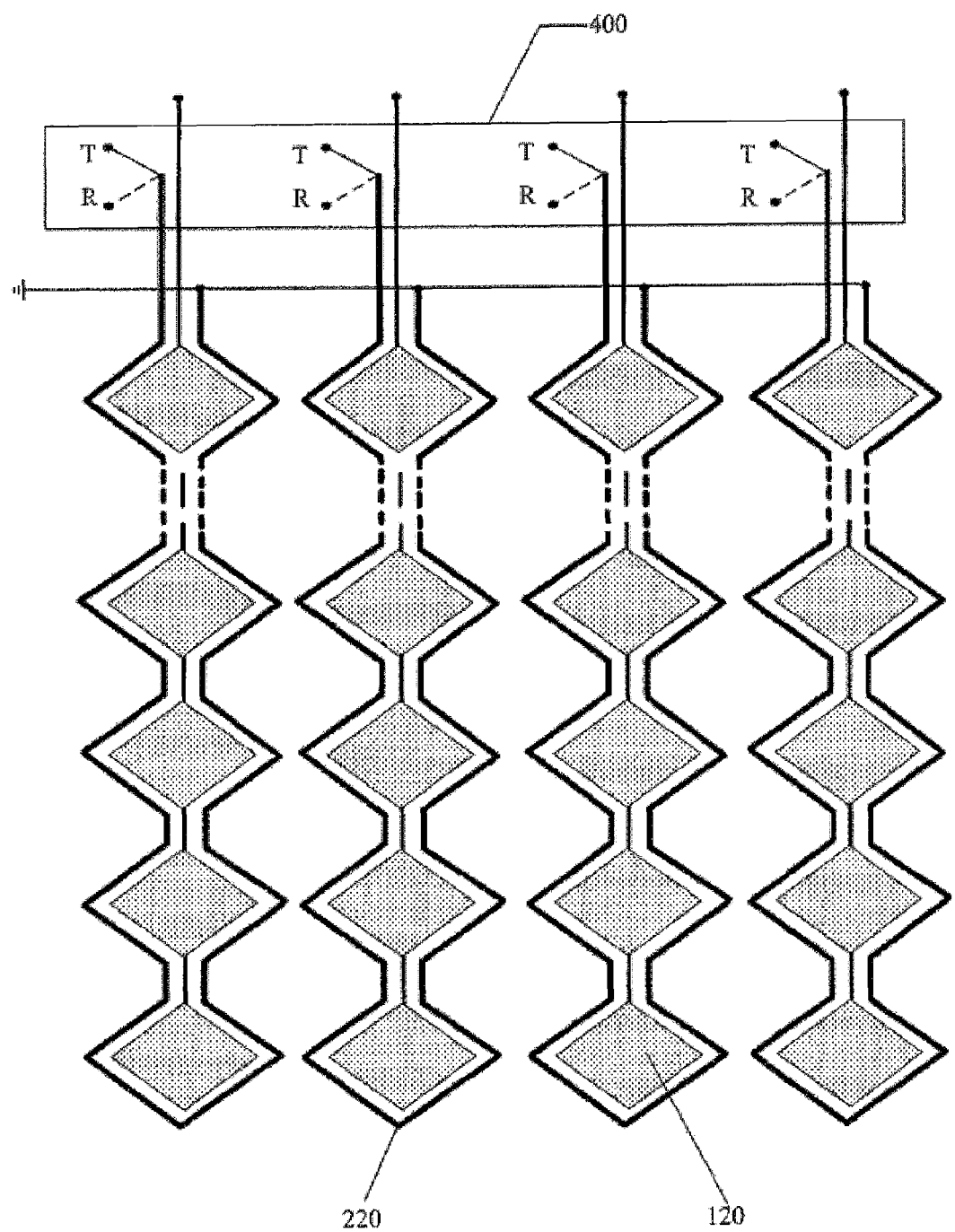
FIG. 5b is a structure diagram of capacitive touch driving electrodes and second electromagnetic touch electrodes that are disposed in a same layer provided in the embodiment of the present invention.

Alternatively, in the above-mentioned touch screen provided in at least one embodiment of the present invention, as shown in FIG. 5b, the second electromagnetic touch electrodes 220 are electrode wires each surrounding at least one capactive touch driving electrode 120. In this cae, one end of the electrode wire is grounded, while the other end is connected to a data selector 400 (MUX), thereby forming a current loop. When an electromagnetic pen touches the touch screen at a certain position, magnetic flux in the current loop at the corresponding position increases, resulting in an increased induced electromotive force on the electrode wire. Assuming that the extension direction of the second electromagnetic touch electrodes is the Y axis direction, it is possible to calculate the Y axis coordinate of the contact position of the electromagnetic pen. The specific touch position of the electromagnetic pen may be determined according to the X axis coordinate and the Y axis coordinate.

In the above-mentioned touch screen provided in at least one embodiment of the present invention, as shown in FIG. 6, the first electromagnetic touch electrodes 210 are electrode wires each surrounding at least one capacitive touch sensing electrode 110; and the second electromagnetic touch electrodes 220 are also electrode wires each surrounding at least one capacitive touch driving electrode 120.

In the above-mentioned touch screen provided in at least one embodiment of the present invention, driving T ports and sensing R ports are provided in the data selector 400 as shown in FIG. 5a, and each electrode wire as the first electromagnetic touch electrode 210 has the other end connected to one driving port T or sensing port R in the data selector 400. In a similar way, as shown in FIG. 5b, each electrode wire as the second electromagnetic touch electrode 220 has the other end connected to one driving port T or sensing port R in the data selector 400. As shown in FIG. 6, the data selector is generally disposed in the electromagnetic touch driving integrated circuit (IC) 500 by which the touch screen loads electromagnetic touch scanning signals into all the first electromagnetic touch electrodes and all the second electromagnetic touch electrodes by scanning line by line.

While the above-mentioned touch screen provided in at least one embodiment of the present invention is implementing electromagnetic touch function, first electromagnetic touch electrodes are connected to corresponding driving ports in the data selector one by one to receive electromagnetic touch scanning signals in turn. After driving ports in the data selector finish providing electromagnetic touch scanning signals to first touch driving electrodes, first electromagnetic touch electrodes are immediately switched to be connected to corresponding sensing ports in the data selector to which first electromagnetic touch electrodes are connected, thereby detecting sensing signals output from the sensing ports. In a similar way, second electromagnetic touch electrodes are connected to corresponding driving ports in the data selector one by one to receive electromagnetic touch scanning signals in turn. After driving ports in the data selector finish providing electromagnetic touch scanning signals to second touch driving electrodes, second electromagnetic touch electrodes are immediately switched to be connected to corresponding sensing ports in the data selector to which first electromagnetic touch electrodes are connected, thereby detecting sensing signals output from the sensing ports. The electromagnetic touch function can be implemented by detecting sensing signals from sensing ports connected with the first electromagnetic touch electrodes and detecting sensing signals from sensing ports connected with the second electromagnetic touch electrodes.

Furthermore, in the above-mentioned touch screen provided in at least one embodiment of the present invention, as shown in FIG. 6, both capacitive touch sensing electrodes 110 and capacitive touch driving electrodes 120 are connected with the capacitive touch driving integrated circuit (IC) 600. Specifically, various known technologies may be used for realizing capacitive touch, which will not be described in detail any more here.

Upon specific implementations, the electromagnetic touch driving integrated circuit (IC) and the capacitive touch driving integrated circuit (IC) may be implemented in the same chip, and of course they may be implemented in different chips, which is not limited herein.

In the above-mentioned touch screen provided in at least one embodiment of the present invention, in order to optimize algorithm and guarantee the uniformity of electromagnetic touch precision, for example, the number of capacitive touch sensing electrodes surrounded by the first electromagnetic touch electrodes and the number of capacitive touch driving electrodes surrounded by the second electromagnetic touch electrodes are equal to each other.

In the above-mentioned touch screen provided in at least one embodiment of the present invention, as shown in FIG. 5a, the shape of the first electromagnetic touch electrode 210 is consistent with the outline shape of at least one capacitive touch sensing electrode 110 surrounded by the first electromagnetic touch electrode 210. Alternatively, as shown in FIG. 5b, the shape of the second electromagnetic touch electrode 220 is consistent with the outline shape of at least one capacitive touch driving electrode 120 surrounded by the second electromagnetic touch electrode 220.

In the above-mentioned touch screen provided in at least one embodiment of the present invention, the shape of the first electromagnetic touch electrode is consistent with the outline shape of at least one capacitive touch sensing electrode surrounded by the first electromagnetic touch electrode, and the shape of the second electromagnetic touch electrode is consistent with the outline shape of at least one capacitive touch sensing electrode surrounded by the second electromagnetic touch electrode, thereby reducing signal interference between capacitive touch and electromagnetic touch modes.

In the above-mentioned touch screen provided in at least one embodiment of the present invention, as shown in FIG. 6, the first electromagnetic touch electrodes 210 may be in a one-to-one correspondence relationship with the capacitive touch sensing electrodes 110; the second electromagnetic touch electrodes 220 may be in a one-to-one correspondence relationship with the capactive touch driving electrodes 120, thereby guaranteeing the same resolution for capacitive touch and electromagnetic touch of the touch screen and in turn optimizing the algorithm, guaranteeing the minimum interference between signals.

Figure 7:
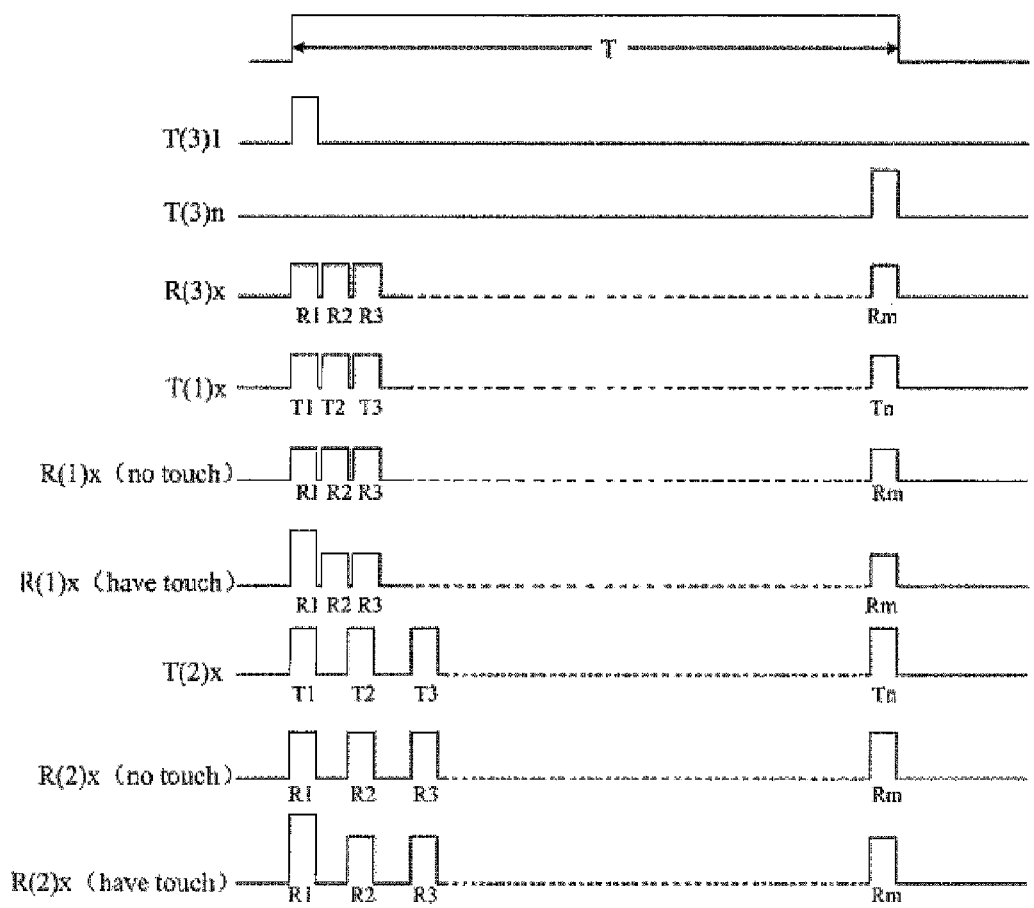
FIG. 7 is a timing diagram for a touch screen provided in an embodiment of the present invention to implement touch function.

For example, in the driving timing diagram shown in FIG. 7, in the touch interval T of a frame, the IC chip connected with the capactive touch driving electrodes T(3)x provides scanning signals T1, T2 . . . Tn to capactive touch driving electrodes T(3)x respectively, and the capacitive touch sensing electrodes R(3)x detect touch sensing signals R1, R2 . . . Rm respectively at the same time, thereby implementing capacitive touch function. Meanwhile, in the touch interval T of a frame, the IC chip connected with the first electromagnetic touch electrodes T(1)x provides electromagnetic touch scanning signals T1, T2, . . . Tn in turn to the first electromagnetic touch electrodes T(1)x. Where there is a touch by the electromagnetic pen, sensing signals R1, R2 . . . Rm output from sensing port R(1)x corresponding to the first electromagnetic touch electrodes T(1)x are higher than the electromagnetic touch scanning signals T1, T2, . . . Tn provided on the first electromagnetic touch electrodes T(2)x. Where there is no touch by the electromagnetic pen, sensing signals R1, R2 . . . Rm output from sensing port R(1)x corresponding to the first electromagnetic touch electrodes T(1)x are equal to the electromagnetic touch scanning signals T1, T2, . . . Tn provided on the first electromagnetic touch electrodes T(1)x. In a similar way, the IC chip connected with the second electromagnetic touch electrodes T(2)x provides electromagnetic touch scanning signals T1, T2, . . . Tn in turn to the second electromagnetic touch electrodes T(2)x. Where there is a touch by the electromagnetic pen, sensing signals R1, R2 . . . Rm output from sensing port R(2)x corresponding to the second electromagnetic touch electrodes T(2)x are higher than the electromagnetic touch scanning signals T1, T2, . . . Tn provided on the second electromagnetic touch electrodes T(2)x. Where there is no touch by the electromagnetic pen, sensing signals R1, R2 . . . Rm output from sensing port R(2)x corresponding to the second electromagnetic touch electrodes T(2)x are equal to the electromagnetic touch scanning signals T1, T2, . . . Tn provided on the first electromagnetic touch electrodes T(2)x. The electromagnetic touch function is thus implemented.

At least one embodiment of the present invention further provides a display device including a display device and the above-mentioned touch screen provided in at least one embodiment of the present invention disposed on the display device. The display device may be any products or components with both display and touch functions such as cell phones, tablets, TV sets, displays, notebook computers, digital picture frames, and navigators. The above-mentioned embodiments of touch screen may be referred to for implementations of the display device and repetitions will not be described any more herein.

In the above-mentioned display device provided in at least one embodiment of the present invention, the display device may be a liquid crystal screen (LCD), an organic electroluminescent display (OLED), a plasma display (PDP) or a cathode ray (CRT) display device, which is not limited herein.

In the touch screen and the display device provided in at least one embodiment of the present invention, the first electromagnetic touch electrodes and the capacitive touch sensing electrodes are disposed in the same layer, the second electromagnetic touch electrodes and the capacitive touch driving electrodes are disposed in the same layer, such that it is possible to simplify layer structures of the touch screen to a great extent, thereby reducing the thickness of the entire touch screen, while guaranteeing electromagnetic touch effect and capacitive touch effect. Furthermore, while manufacturing, the first electromagnetic touch electrodes and the capacitive touch sensing electrodes may be prepared by same one patterning process, the second electromagnetic touch electrodes and the capacitive touch driving electrodes may be manufactured by same one patterning process, thereby simplifying the manufacturing process to a great extent and in turn saving the production costs of the entire touch screen.

What are described above is related to the illustrative embodiments of the disclosure only and not limitative to the scope of the disclosure; the scopes of the disclosure are defined by the accompanying claims.

The present application claims priority of a Chinese patent application No. 201410140409.3 filed on Apr. 9, 2014, which is incorporated in its entirety herein by reference as part of the present application.

The invention claimed is:

1. A touch screen comprising:
    capacitive touch sensing electrodes;
    capacitive touch driving electrodes insulated from and disposed to intersect the capacitive touch sensing electrodes;
    first electromagnetic touch electrodes, insulated from and disposed in a same layer as the capacitive touch sensing electrodes;
    second electromagnetic touch electrodes, insulated from and disposed in a same layer as the capacitive touch driving electrodes, and insulated from and disposed to intersect the first electromagnetic touch electrodes;
    wherein the capacitive touch sensing electrodes, the capacitive touch driving electrodes, the first electromagnetic touch electrodes and the second electromagnetic touch electrodes are disposed in a same layer, and the touch screen further comprises:
    a bridging layer configured for bridging adjacent capacitive touch sensing electrodes and bridging adjacent first electromagnetic touch electrodes, or a bridging layer configured for bridging adjacent capacitive touch driving electrodes and bridging adjacent second electromagnetic touch electrodes; and
    an insulating layer between the bridging layer and the capacitive touch sensing electrodes, the capacitive touch driving electrodes, the first electromagnetic touch electrodes and the second electromagnetic touch electrodes disposed in a same layer.

2. The touch screen of claim 1, wherein the first electromagnetic touch electrodes and the second electromagnetic touch electrodes are disposed on different planes, and the touch screen further comprises:
    an insulating layer between the capacitive touch sensing electrodes and the first electromagnetic touch electrodes disposed in the same layer while the capacitive touch driving electrodes and the second electromagnetic touch electrodes disposed in the same layer.

3. The touch screen of claim 1, wherein an extension direction of the first electromagnetic touch electrodes is perpendicular to an extension direction of the second electromagnetic touch electrodes.

4. The touch screen of claim 1, wherein the first electromagnetic touch electrodes are electrode wires surrounding at least one of the capacitive touch sensing electrodes; and/or
the second electromagnetic touch electrodes are electrode wires surrounding at least one of the capacitive touch driving electrodes.

5. The touch screen of claim 4, wherein a shape of the first electromagnetic touch electrodes is consistent with an outline shape of at least one of the capacitive touch sensing electrodes surrounded by the first electromagnetic touch electrodes; and/or
a shape of the second electromagnetic touch electrodes is consistent with an outline shape of at least one of the capacitive touch driving electrodes surrounded by the second electromagnetic touch electrodes.

6. The touch screen of claim 4, wherein the first electromagnetic touch electrodes are in a one-to-one correspondence relationship with the capacitive touch sensing electrodes; and
the second electromagnetic touch electrodes are in a one-to-one correspondence relationship with the capacitive touch driving electrodes.

7. The touch screen of claim 1, wherein materials for the capacitive touch sensing electrodes, the capacitive touch driving electrodes, the first electromagnetic touch electrodes and the second electromagnetic touch electrodes are all transparent conducting oxides.

8. A display device comprising a display device and the touch screen of claim 1 disposed on the display device.

9. The display device of claim 8, wherein the display device is a liquid crystal display screen, an organic electroluminescent display screen, a plasma display screen or a cathode ray display screen.

10. The touch screen of claim 5, wherein the first electromagnetic touch electrodes are in a one-to-one correspondence relationship with the capacitive touch sensing electrodes; and
the second electromagnetic touch electrodes are in a one-to-one correspondence relationship with the capacitive touch driving electrodes.

11. The touch screen of claim 1, wherein the first electromagnetic touch electrodes are electrode wires surrounding at least one of the capacitive touch sensing electrodes; and/or
the second electromagnetic touch electrodes are electrode wires surrounding at least one of the capacitive touch driving electrodes.

12. The touch screen of claim 11, wherein a shape of the first electromagnetic touch electrodes is consistent with an outline shape of at least one of the capacitive touch sensing electrodes surrounded by the first electromagnetic touch electrodes; and/or
a shape of the second electromagnetic touch electrodes is consistent with an outline shape of at least one of the capacitive touch driving electrodes surrounded by the second electromagnetic touch electrodes.

13. The touch screen of claim 11, wherein the first electromagnetic touch electrodes are in a one-to-one correspondence relationship with the capacitive touch sensing electrodes; and
the second electromagnetic touch electrodes are in a one-to-one correspondence relationship with the capacitive touch driving electrodes.

14. The touch screen of claim 12, wherein the first electromagnetic touch electrodes are in a one-to-one correspondence relationship with the capacitive touch sensing electrodes; and
the second electromagnetic touch electrodes are in a one-to-one correspondence relationship with the capacitive touch driving electrodes.

15. The touch screen of claim 1, wherein materials for the capacitive touch sensing electrodes, the capacitive touch driving electrodes, the first electromagnetic touch electrodes and the second electromagnetic touch electrodes are all transparent conducting oxides.

16. The touch screen of claim 2, wherein the first electromagnetic touch electrodes are electrode wires surrounding at least one of the capacitive touch sensing electrodes; and/or
the second electromagnetic touch electrodes are electrode wires surrounding at least one of the capacitive touch driving electrodes.

17. The touch screen of claim 16, wherein a shape of the first electromagnetic touch electrodes is consistent with an outline shape of at least one of the capacitive touch sensing electrodes surrounded by the first electromagnetic touch electrodes; and/or
a shape of the second electromagnetic touch electrodes is consistent with an outline shape of at least one of the capacitive touch driving electrodes surrounded by the second electromagnetic touch electrodes.

18. The touch screen of claim 16, wherein the first electromagnetic touch electrodes are in a one-to-one correspondence relationship with the capacitive touch sensing electrodes; and
the second electromagnetic touch electrodes are in a one-to-one correspondence relationship with the capacitive touch driving electrodes.

19. The touch screen of claim 17, wherein the first electromagnetic touch electrodes are in a one-to-one correspondence relationship with the capacitive touch sensing electrodes; and
the second electromagnetic touch electrodes are in a one-to-one correspondence relationship with the capacitive touch driving electrodes.

* * * * *